GEORGE GRAHAM, OF NEW HAVEN, CONNECTICUT.

Letters Patent No. 86,299, dated January 26, 1869.

IMPROVEMENT IN THE MANUFACTURE OF MATCHES.

The Schedule referred to in these Letters Patent and making part of the same.

*To all whom it may concern:*

Be it known that I, GEORGE GRAHAM, of New Haven, in the county of New Haven, and State of Connecticut, have invented a new Improvement in Matches; and I do hereby declare the following to be a full, clear, and exact description of the same.

This invention relates to an improvement in matches, the object being to produce a match-stick tipped with a substance, which, while it will surely ignite the prepared stick, cannot be extinguished, until the stick is lighted; and The invention consists in preparing the stick by charring it at the end, then dipping in melted paraffine, and when the paraffine is cooled thereon, again dipping in a preparation of amorphous phosphorus, flour, potash, and gum, which forms a bulb upon the end of the stick.

To enable others to fully understand my invention, I will proceed to describe the same.

I first form the sticks in the usual or any desirable manner, and char one end by any convenient process of burning.

The sticks thus prepared, I dip into melted paraffine to a depth of about one inch, or half the length. This done, and the paraffine cooled, the sticks are ready for the bulb.

The material for the bulb consists of and is prepared in the following manner:

Take, of amorphous phosphorus, one-half pound; wheat-flour, eight pounds; chlorate of potash, ten pounds. Add any suitable or desirable coloring-material; and for the purpose of perfuming the bulb, while burning, add about two pounds of cascarilla-bark.

Mix all together with gum-water, until it assumes the consistency of thick paste, then dip the charred or coated end of the sticks into this material, taking up a sufficient quantity to form the bulb for ignition, and when dried, the match is complete.

The match is struck in the usual manner, to ignite the bulb, and the composition of the bulb, when once ignited, cannot be extinguished until entirely consumed.

It should be here remarked, that without the coating of the sticks, as described, the bulb would not ignite the wood, but simply consume itself; but by this preparation of the wood, the stick is surely ignited from the burning bulb.

These matches, useful for general purposes, are particularly adapted to use in exposed or windy places.

Having fully described my invention,

What I claim as new and useful, and desire to secure by Letters Patent, is—

As an improved article of manufacture, matches, constructed and prepared in the manner substantially as set forth.

GEORGE GRAHAM.

Witnesses:
  A. J. TIBBITS,
  JOHN H. SHUMWAY.